United States Patent
Evers

(10) Patent No.: US 9,518,514 B2
(45) Date of Patent: Dec. 13, 2016

(54) FLAP DEVICE FOR AN INTERNAL COMBUSTION ENGINE

(71) Applicant: PIERBURG GMBH, Neuss (DE)

(72) Inventor: Markus Evers, Leverkusen (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 14/649,215

(22) PCT Filed: Nov. 12, 2013

(86) PCT No.: PCT/EP2013/073620
§ 371 (c)(1),
(2) Date: Jun. 3, 2015

(87) PCT Pub. No.: WO2014/086557
PCT Pub. Date: Jun. 12, 2014

(65) Prior Publication Data
US 2015/0300268 A1    Oct. 22, 2015

(30) Foreign Application Priority Data
Dec. 5, 2012  (DE) ........................ 10 2012 111 810

(51) Int. Cl.
*F16K 1/228*  (2006.01)
*F02D 9/10*  (2006.01)
(Continued)

(52) U.S. Cl.
CPC ................ *F02D 9/106* (2013.01); *F02D 9/04* (2013.01); *F16K 1/226* (2013.01); *F16K 1/2268* (2013.01)

(58) Field of Classification Search
CPC ...... F02D 9/106; F16K 1/2268; F16K 41/026; F16K 41/046
See application file for complete search history.

(56) References Cited

U.S. PATENT DOCUMENTS 3,693,935 A    9/1972  Thauer
4,231,341 A   11/1980  Kuramoto et al.
(Continued)

FOREIGN PATENT DOCUMENTS

DE    1 123 876 B    2/1962
DE    39 05 655 A1   8/1990
(Continued)

OTHER PUBLICATIONS

S. Hildebrandt: "Feinmechanische Bauelemente", Hanser Verlag, vol. 3, English Excerpts, pp. 277-280 (1978).

*Primary Examiner* — Jonathan Matthias
(74) *Attorney, Agent, or Firm* — Norman B. Thot

(57) ABSTRACT

A flap device for an internal combustion engine includes a flow housing comprising a flow channel, a bore arranged in the flow housing, an actuating shaft which protrudes outwards through the bore, a flap body arranged on the actuating shaft, a first bearing bush, and a sealing element radially surrounding the actuating shaft. The first bearing bush is arranged in the bore and has the actuating shaft mounted therein. An axial end of the first bearing bush protrudes beyond an end of the bore. The sealing element comprises at least one plate spring arranged between a first disc and a second disc. The first disc is secured on the actuating shaft and supports the at least one plate spring. The at least one plate spring rests against the second disc so that the second disc rests against the axial end of the first bearing bush which protrudes beyond the bore.

17 Claims, 2 Drawing Sheets

(51) Int. Cl.
*F02D 9/04* (2006.01)
*F16K 1/226* (2006.01)

(56) References Cited

U.S. PATENT DOCUMENTS

| | | |
|---|---|---|
| 5,005,545 A | 4/1991 | Wendel et al. |
| 5,401,001 A | 3/1995 | Cook et al. |
| 5,630,571 A | 5/1997 | Kipp et al. |
| 2004/0182440 A1 | 9/2004 | Watts et al. |
| 2013/0001882 A1 | 1/2013 | Voigtlaender et al. |

FOREIGN PATENT DOCUMENTS

| | | | |
|---|---|---|---|
| DE | 43 13 454 A1 | 10/1994 | |
| DE | GB 2277368 A * | 10/1994 | ............... F02D 9/04 |
| DE | 693 01 463 T2 | 8/1996 | |
| DE | 297 16 937 U1 | 10/1997 | |
| DE | 203 02 520 U1 | 6/2004 | |
| DE | 20 2008 005 992 U1 | 8/2008 | |
| GB | 889952 A | 2/1962 | |
| JP | 4-30238 U | 3/1992 | |
| JP | 7-259586 A | 10/1995 | |
| JP | 10-169472 A | 6/1998 | |
| JP | 2005-042845 A | 2/2005 | |
| JP | 2012-41886 A | 3/2012 | |
| WO | WO 2011/091909 A1 | 8/2011 | |

\* cited by examiner

FLAP DEVICE FOR AN INTERNAL COMBUSTION ENGINE

CROSS REFERENCE TO PRIOR APPLICATIONS

This application is a U.S. National Phase application under 35 U.S.C. §371 of International Application No. PCT/EP2013/073620, filed on Nov. 12, 2013 and which claims benefit to German Patent Application No. 10 2012 111 810.8, filed on Dec. 5, 2012. The International Application was published in German on Jun. 12, 2014 as WO 2014/086557 A1 under PCT Article 21(2).

FIELD

The present invention relates to a flap device for an internal combustion engine comprising a flow housing in which a flow channel is formed, an actuating shaft, a flap body arranged on the actuating shaft in the flow channel, a bore in the flow housing through which the actuator shaft protrudes outward, a first bearing bush in which the actuator shaft is supported and which is arranged in the bore, wherein an axial end of the bearing bush extends beyond the end of the bore, and a sealing which radially surround the actuating shaft and which comprises at least one spring element.

BACKGROUND

Such flap devices serve, for example, as exhaust gas retention flaps or as exhaust gas feedback flaps in the exhaust gas system of an internal combustion engine. The exhaust gas contains pollutants which must not be released to the outside so that a reliable sealing must be provided along the shaft that protrudes outward towards an actuator. This sealing must function perfectly at any time and under varying thermal stresses. A precise controllability must also be maintained with the flaps in order to meet the emission regulations for modern internal combustions engines.

Various flap devices have previously been described which attempt to attain these goals. DE 20 2008 005 992 U1 describes a flap valve supported on two sides for use in the hot gas zone of exhaust gas systems in which a seal arranged on an oblique shoulder of the shaft is pressed against an opposite sealing surface of the housing by a spring force. The sealing point simultaneously serves to axially secure the flap valve. A closing of the flap as well as an occurring thermal expansion may jam the flap in the cannel due to the flaps being centered in the channel.

An exhaust gas flap is also described in U.S. Pat. No. 5,630,571 wherein a steel disc is mounted on the shaft behind a bearing bush, which disc is concavely shaped at its end averted from the flow channel and which abuts on a correspondingly convexly shaped ceramic disc. The latter abuts on a bush with its flat opposite axial end, which bush is mounted in a press-fit at the bore, the bush extending beyond the end of the flow housing. A disc is mounted on the end of the shaft, which disc serves as a lever to actuate the flap. A wave spring is arranged between the disc and the bush, via which the steel disc is pressed against the ceramic disc for sealing and a shoulder of the shaft is pressed against the first bearing bush.

When thermal expansion occurs or when tolerances are provided with insufficient precision, the consequence is that either the sealing faces of the ceramic disc no longer abut on the steel disc with sufficient strength, or the position of the flap in the channel is no longer sufficiently fixed, which may lead to a jamming of the flap in the channel. An increased wear of the wave spring also results since a relative movement exists between the disc carrying the lever and the second bush, which results in a movement along the spring surface.

The known designs therefore have drawbacks in that, when thermal conditions change, a sufficient sealing and an adjustability of the flap are not provided without a risk of jamming.

SUMMARY

An aspect of the present invention is to provide a flap device for an internal combustion engine in which, independent of the thermal stress and the thermal expansion caused thereby, a secure sealing and a free movement of the flap body is provided. An additional aspect of the present invention is to provide a flap device for an internal combustion engine which has a reduced wear, a long useful life, and which is economic to manufacture and to assemble.

In an embodiment, the present invention provides a flap device for an internal combustion engine which includes a flow housing comprising a flow channel, a bore comprising an end, an actuating shaft arranged to protrude outwards through the bore, a flap body arranged on the actuating shaft in the flow channel, a first bearing bush comprising an axial end, and a sealing element arranged to radially surround the actuating shaft. The bore is arranged in the flow housing. The first bearing bush is arranged in the bore and is configured to have the actuating shaft be mounted therein. The axial end of the first bearing bush is arranged to protrude beyond the end of the bore. The sealing element comprising at least one spring element provided as at least one plate spring, a first disc, and a second disc. The at least one plate spring is arranged between the first disc and the second disc. The first disc is rigidly secured on the actuating shaft and supports the at least one plate spring. The at least one plate spring is arranged so as to rest against the second disc in a pre-tensioned manner so that the second disc rests, in a spring-loaded manner, against the axial end of the first bearing bush which protrudes beyond the bore.

BRIEF DESCRIPTION OF THE DRAWINGS

The present invention is described in greater detail below on the basis of embodiments and of the drawings in which.

DETAILED DESCRIPTION

Figure 1:
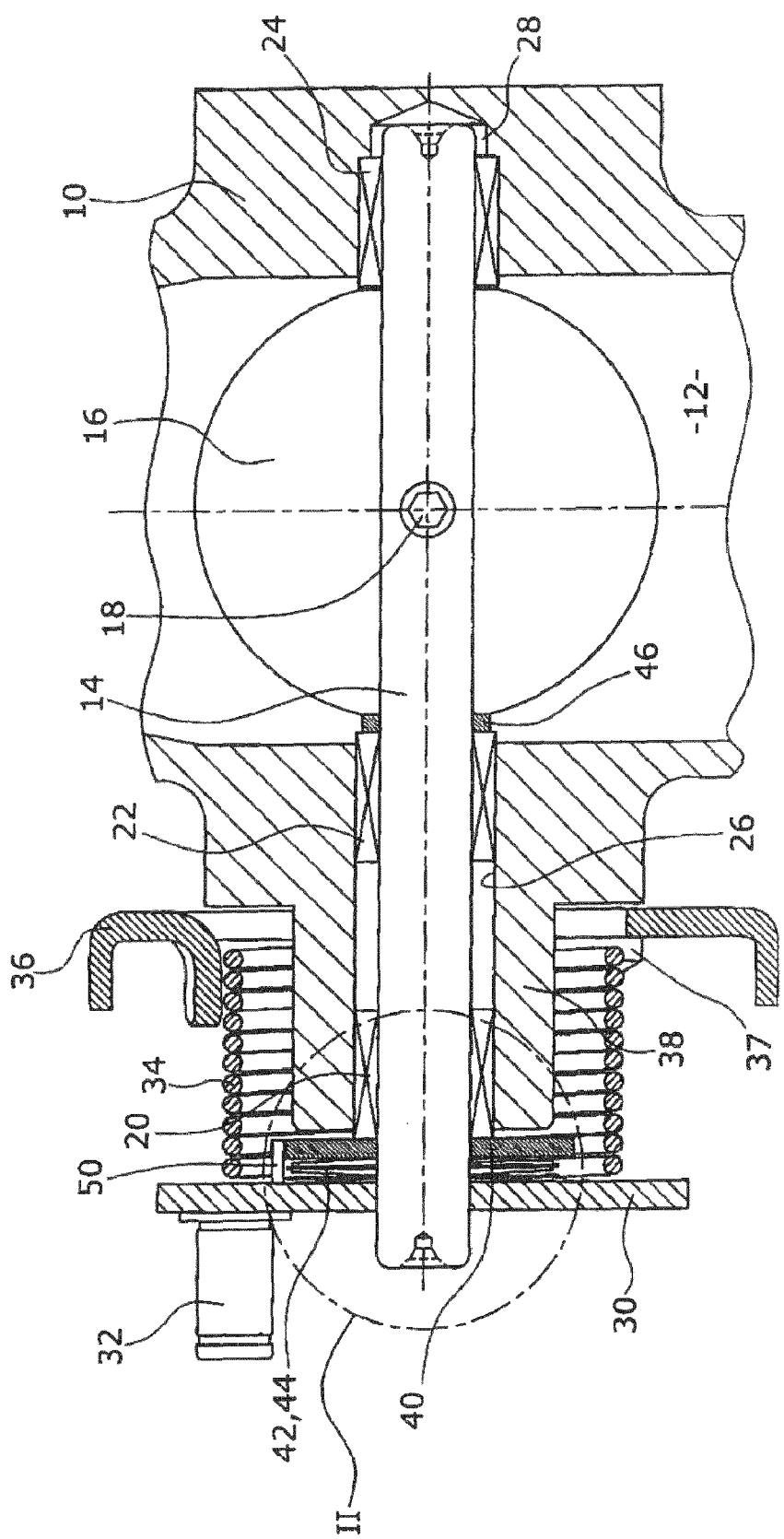
FIG. 1 shows a side elevational view of a flap device of the present invention in section.
Figure 2:
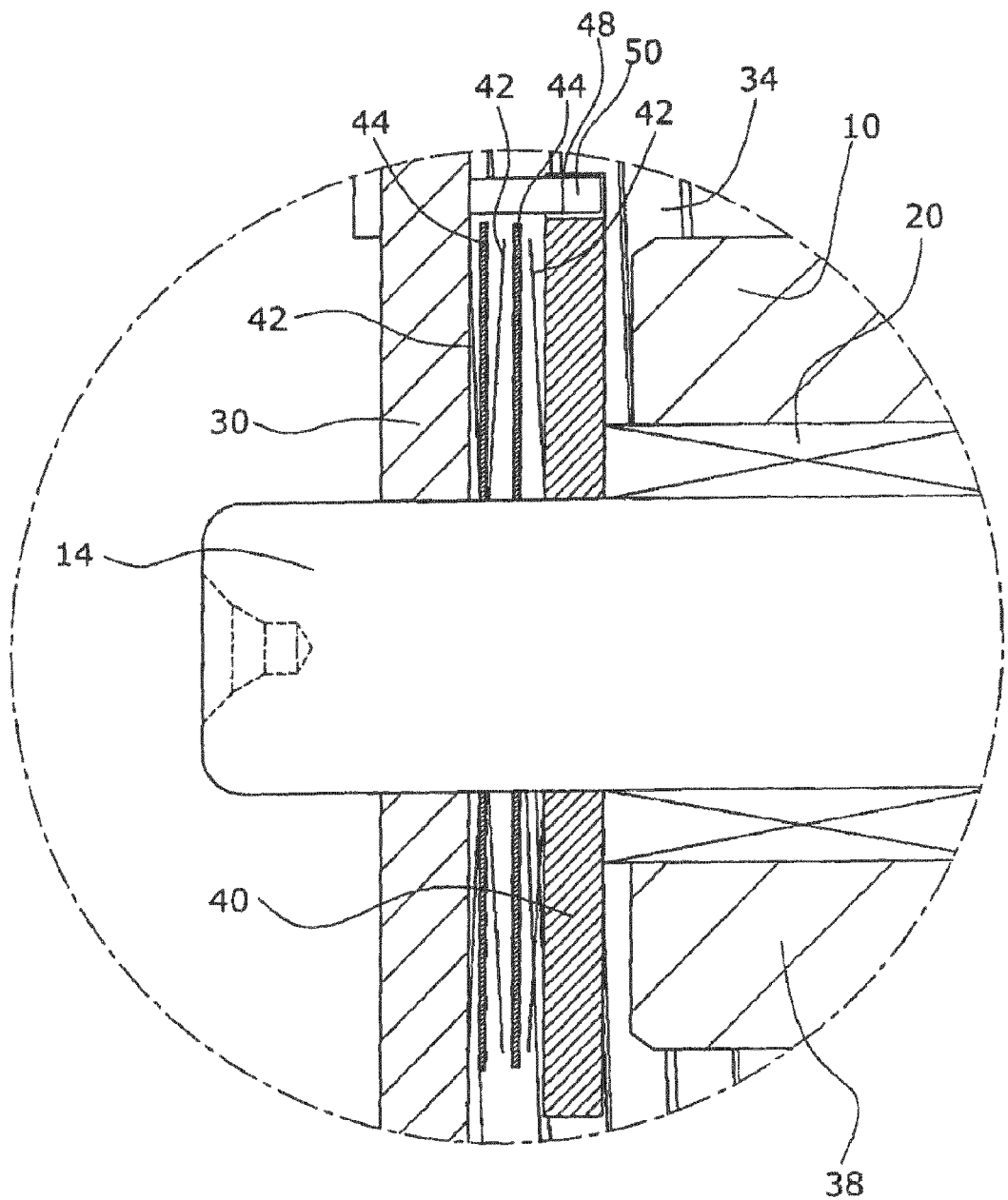
FIG. 2 shows an enlarged detail of the shaft sealing of the flap device of the present invention shown in FIG. 1.

Because the sealing comprises a first disc and a second disc between which at least one plate spring is arranged as the spring element, wherein the first disc is fixedly mounted on the actuating shaft and serves as a support for the at least one plate spring which is pre-tensioned to abut against the second disc so that the second disc abuts in a spring-loaded manner on the end of the first bearing bush that protrudes beyond the bore, a sealing along the actuating shaft is achieved by the plate spring, which sealing effect is not impaired by axial expansion, given a sufficient pre-tensioning of the plate spring. Due to the axial elasticity of the plate springs, the axial position of the shaft is not fixed to a defined position, but is variable in the axial direction so that a slight displacement of the axial position of the actuating shaft, e.g., by turning the flap or by a thermal expansion, cannot lead to a jamming of the flap.

In an embodiment of the present invention, the sealing means can, for example, comprise at least three plate springs which are respectively arranged in mutually opposite directions. A sufficient elasticity of the plate spring package as well as a sufficient spring force and thus a sufficient sealing effect of the plate springs are thereby provided.

In a embodiment of the present invention, an adjusting washer is respectively arranged between the plate springs. A planar support surface is thereby formed for each plate spring, whereby the sealing effect is further improved.

In an embodiment of the present invention, the first disc can, for example, serve as a lever to actuate the actuating shaft and is fastened on the actuating shaft by a material bonding. The first disc thus prevents a sealing to the outside along the shaft by the inner side of the plate springs, while these provide for a radially outward directed sealing. An additional component for a sealing along the shaft is not required so that the number of parts used is reduced.

In an embodiment of the present invention, the first disc and the second disc can, for example, be rotatorily connected. A relative movement of one of the two discs with respect to the plate springs is thereby prevented since the entire package rotates with the actuating shaft. This prevents wear of the plate springs and of the components abutting thereon, which wear would reduce the sealing effect.

In an embodiment of the present invention, this is realized by providing the second disc with a recess for the purpose of rotatory coupling, into which recess an axially extending arm of the first disc engages. A form-fitting connection between the discs is thereby made in a particularly simple manner, while the manufacturing costs are low and the assembly is facilitated.

In an embodiment of the present invention, the flap body or a bush or a thrust washer arranged between the flap body and a bearing bush can, for example, be pre-tensioned against the bearing bush by the force of the at least one plate spring. In this embodiment, the bearing bush with the flap body serves to axially secure the actuating shaft so that this axial securing is no longer effected by the sealing. The internal leakage in the flow channel can be reduced in this manner when the flap is closed since the outer contour of the flap body can be adapted more precisely to the channel. By virtue of the flexibility of the sealing, the abutment of the flap body, and thus the axial securing and fixing of the actuating shaft, no longer causes a disengagement of the sealing from each other. In order to additionally reduce wear via the flap body in such an axial securing, the flap body rests on a thrust washer or bush adjoining the second bearing bush.

In an embodiment of the present invention, a second bearing bush is provided in the bore which extends into the flow channel by its axial end, wherein the flap body is pre-tensioned by the force of the at least one plate spring against the second bearing bush or a thrust washer adjoining the second bearing bush. This embodiment facilitates assembly and improves the support of the actuating shaft, while the internal leakage is still negligible and wear is reduced.

In an embodiment of the present invention, a blind hole is formed in the side of the flow housing opposite the bore, in which blind hole a third bearing bush is arranged in which the actuating shaft is supported, the axial end of the third bearing bush protruding into the flow channel. The actuating shaft is accordingly supported on both sides in the flow housing so that damage to the bearing bush need not be expected even with high exhaust gas pressures. Due to a protrusion on the flap body that engages around the bearing bush, an intrusion of dirt into the third bearing bush can be avoided to the greatest possible extent when the bush extends into the flow housing, whereby the useful life is extended.

In an embodiment of the present invention, the three bearing bushes can, for example, be mounted in a press fit in the blind hole and the bore so that leakage along the inner side of the bore is prevented by the bearing bushes.

A flap device for an internal combustion engine is thus provided which is sufficiently tight to the outside and only shows negligible internal leakage. This tightness is maintained even under varying thermal conditions since the axially flexible plate springs compensate for both component and assembly tolerances and thermal expansion without compromising the sealing effect. Ingress of dirt from outside is also avoided. The wear of the flap device and its sealing is significantly reduced so that a long useful life is achieved. Due to the low number of components, manufacturing and assembly costs are also reduced.

An embodiment of the flap device of the present invention is illustrated in the drawings and will be described hereunder.

The flap device of the present invention consists of a flow housing 10 in which a flow channel 12 is formed through which an exhaust gas, for example, flows.

In cross section, the flow channel 12 is divided in half by an actuating shaft 14 on which a flap body 16 is fastened by a screw 18. The actuating shaft 14 is supported in the flow housing 10 by three bearing bushes 20, 22, 24, of which the first bearing bush 20 and the second bearing bush 22 are arranged in a continuous bore 26 through which the actuating shaft 14 extends outward from the flow housing 10, and the third bearing bush 24 is arranged on the side opposite the continuous bore 26 in a blind hole 28 formed in the flow housing 10, an axial end of the third bearing bush 24 extending into the flow channel 12. The actuating shaft 14 is thus supported on two sides which are opposite each other with respect to the center axis of the flow housing 10.

On the outward protruding end of the actuating shaft 14, a first disc 30 is mounted that serves as a lever, the end portion thereof having a pin 32 fastened thereon, via which pin 32 the actuating shaft 14 can be connected with an actuator, through a lever linkage (not illustrated herein) which actuator can in particular be configured as an electric motor.

On the side of the first disc 30 opposite the pin 32, a return spring 34 is arranged in the radially outer region, one end of the return spring 34 resting in a manner known per se on a protrusion (not illustrated herein) formed on the first disc 30, while the opposite end of the return spring 34 rests on an abutment 37 formed on the housing 36 of the actuator, which housing 36 surrounds a support and sealing section 38 of the flow housing 10 that extends from the flow housing 10 towards the lever/first disk 30, the flow housing 10 serving as a guide and an axial support for the return spring 34. Depending on the application, in the event the actuator fails, the actuating shaft 14 moves to a defined fail-safe position thereof in a manner known per se due to a pre-tensioning of the return spring 34 during assembly.

According to the present invention, the axial end of first bearing bush 20 averted from the flow channel 12 protrudes beyond the continuous bore 26 and the sealing and support section 38. A second disc 40 configured as a driving disc abuts against the first bearing bush 20, the second disc 40 being pressed against the first bearing bush 20 by three plate springs 42. The three plate springs 42 are arranged opposite each other so that, alternately, either the radially inner or outer surfaces face each other. An adjusting washer 44 is arranged between the three plate springs 42, respectively, which adjusting washers 44 further increase the sealing effect of the three plate springs 42. The spring force of the three plate springs 42 is generated by pressing the first disc 30 against the three plate springs 42 during assembly so that they are pre-tensioned, and by laser welding them in this position on the actuating shaft 14.

As a consequence thereof, the second disc 40 is driven/pressed against the first bearing bush 20 and the flap body 16 is pressed against a thrust washer 46 in the flow channel 12, and the thrust washer 46 is pressed against the second bearing bush 22 whose axial end protrudes into the flow channel 12. The thrust washer 46 serves to reduce wear since the flap body 16 is not turned directly on the second bearing bush 22. The axial securing of the actuating shaft 14 in the flow channel 12 is thereby effected. This axial securing is thus independent of the sealing surfaces.

When, in operation, exhaust gas flows from the flow channel 12 towards the continuous bore 26, a further flow is prevented in the radial outer region by the press fit of the first bearing bush 20 and the second bearing bush 22. Exhaust gas can flow through the first bearing bush 20 and the second bearing bush 22 along the actuating shaft 14. This exhaust gas cannot, however, escape to the outside since a further flow along the actuating shaft 14 is prevented at the weld seam of the first disc 30 which, accordingly, must be realized as a circumferential seam. A sealing in the radial direction is further effected by the support surface of the second disc 40 on the first bearing bush 20, which surface acts as a sealing surface, and by the support surfaces between the three plate springs 42 or of the three plate springs 42 on the adjusting washers 44, as well as on the first disc 30 and on the second disc 40, which surfaces act as sealing surfaces.

For the sealing effect to last as long as possible, the outer circumference of the second disc 40 is provided with a recess 48 in which an arm 50 engages in a form-fitting manner, the arm 50 extending axially from the first disc 30. The second disc 40 and, together with the same, the spring package with the three plate springs 42 is thereby always turned together with the first disc 30 and the actuating shaft 14 so that no relative movement between the parts occurs which could lead to increased wear and thus to a decreasing sealing effect. A relative movement accordingly only occurs between the second disc 40 and the first bearing bush 20. Wear is also reduced at this position by a suitable selection of the material of the bearing bushes 20, 22, 24.

If, in operation or during assembly, component or assembly tolerances occur that have not been taken into account, or if, for example, thermal expansion caused by varying thermal conditions or wear caused by use occurs, a sufficient sealing is still provided since axial offsets are compensated by the flexibility of the spring plates acting as a sealing element. Even a centering of the flap body in the position closing the channel does not lead to a separation of the sealing parts due to this axial compensation by the pre-tensioned and sealing plate springs. A jamming of the flap in the event of a thermally caused expansion is prevented by the separation of the axial securing of the shaft and the sealing. The ingress of dirt from outside is prevented by the fact that the sealing is already positioned before the first bearing bush, as seen from outside. The flap device and its sealing therefore have a long useful life due to low wear.

It should be clear that the scope of protection is not restricted to the embodiments described herein, but that various modifications are possible. For example, it is possible to omit the adjusting washers 44 between the three plate springs 42. It is also possible to realize the connection between the first disc 30 and the actuating shaft 14 by other material connections. This kind of sealing can also be used if only one bearing bush is provided in the bore or no other bearing is used on the opposite side. In such a case, the abutment of the flap body 16 on the bearing bush may possibly be realized, for example, by a tube section extending into the bore. Reference should also be had to the appended claims.

What is claimed is:

1. A flap device for an internal combustion engine, the flap device comprising:
   a flow housing comprising a flow channel;
   a bore comprising an end, the bore being arranged in the flow housing;
   an actuating shaft arranged to protrude outwards through the bore;
   a flap body arranged on the actuating shaft in the flow channel;
   a first bearing bush comprising an axial end, the first bearing bush being arranged in the bore and configured to have the actuating shaft be mounted therein, the axial end of the first bearing bush being arranged to protrude beyond the end of the bore; and
   a sealing element arranged to radially surround the actuating shaft, the sealing element comprising,
      at least one spring element provided as at least one plate spring,
      a first disc, and
      a second disc,
      wherein,
      the at least one plate spring is arranged between the first disc and the second disc,
      the first disc is rigidly secured on the actuating shaft and supports the at least one plate spring,
      the at least one plate spring is arranged so as to rest against the second disc in a pre-tensioned manner so that the second disc rests, in a spring-loaded manner, against the axial end of the first bearing bush which protrudes beyond the bore, and
      the first disc and the second disc are rotatorily connected to each other to prevent a relative movement between the first disk or the second disk and plate spring.

2. The flap device as recited in claim 1, wherein the sealing element comprises at least three plate springs which are respectively arranged opposite to each other.

3. The flap device as recited in claim 2, further comprising at least one adjusting disc, a respective at least one adjusting disc being arranged between respective plate springs.

4. The flap device as recited in claim 1, further comprising a material connection configured to fasten the first disc on the actuating shaft, wherein the first disc acts as a lever to actuate of the actuating shaft.

5. The flap device as recited in claim 1, wherein,
   the first disc comprises an axially extending arm, and
   the second disc comprises a recess configured to have the axially extending arm of the first disc engage therewith so as to provide the rotatory connection.

6. The flap device as recited in claim 1, further comprising:
   a second bearing bush arranged in the bore and configured to have the actuating shaft be mounted therein; and
   a bush or thrust washer arranged between the flap body and the first bearing bush or the second bearing bush, wherein, the flap body, or the bush or thrust washer, is spring-loaded against the bearing bush by a force of the at least one plate spring.

7. The flap device as recited in claim 6, wherein,
the second bearing bush comprises an axial end which extends into the flow channel, and
the flap body is spring-loaded against the second bearing bush or against the bush or thrust washer adjoining the second bearing bush via the force of the at least one plate spring.

8. The flap device as recited in claim 6, further comprising:
a third bearing bush comprising an axial end, the third bearing bush being configured to support the actuating shaft,
wherein,
the flow housing comprises a blind hole on a side of the flow housing opposite the bore, the third bearing bush being arranged in the blind hole, and
the axial end of the third bearing bush protrudes into the flow channel.

9. The flap device as recited in claim 8, wherein,
the first bearing bush and the second bearing bush are each fastened in a press-fit in the bore, and
the third bearing bush is fastened in a press-fit in the blind hole.

10. A flap device for an internal combustion engine, the flap device comprising:
a flow housing comprising a flow channel;
a bore comprising an end, the bore being arranged in the flow housing;
an actuating shaft arranged to protrude outwards through the bore;
a flap body arranged on the actuating shaft in the flow channel;
a first bearing bush comprising an axial end, the first bearing bush being arranged in the bore and configured to have the actuating shaft be mounted therein, the axial end of the first bearing bush being arranged to protrude beyond the end of the bore;
a second bearing bush arranged in the bore and configured to have the actuating shaft be mounted therein;
a third bearing bush comprising an axial end, the third bearing bush being configured to support the actuating shaft;
a bush or thrust washer arranged between the flap body and the first bearing bush or the second bearing bush; and
a sealing element arranged to radially surround the actuating shaft, the sealing element comprising,
at least one spring element provided as at least one plate spring,
a first disc, and
a second disc;
wherein,
the at least one plate spring is arranged between the first disc and the second disc,
the first disc is rigidly secured on the actuating shaft and supports the at least one plate spring, and
the at least one plate spring is arranged so as to rest against the second disc in a pre-tensioned manner so that the second disc rests, in a spring-loaded manner, against the axial end of the first bearing bush which protrudes beyond the bore, and
wherein,
the flap body, or the bush or thrust washer, is spring-loaded against the second bearing bush by a force of the at least one plate spring,
the flow housing comprises a blind hole on a side of the flow housing opposite the bore, the third bearing bush being arranged in the blind hole, and
the axial end of the third bearing bush protrudes into the flow channel.

11. The flap device as recited in claim 10, wherein the sealing element comprises at least three plate springs which are respectively arranged opposite to each other.

12. The flap device as recited in claim 11, further comprising at least one adjusting disc, a respective at least one adjusting disc being arranged between respective plate springs.

13. The flap device as recited in claim 10, further comprising a material connection configured to fasten the first disc on the actuating shaft, wherein the first disc acts as a lever to actuate of the actuating shaft.

14. The flap device as recited in claim 10, wherein the first disc and the second disc are rotatorily coupled to each other.

15. The flap device as recited in claim 14, wherein,
the first disc comprises an axially extending arm, and
the second disc comprises a recess configured to have the axially extending arm of the first disc engage therewith so as to provide the rotatorily coupling.

16. The flap device as recited in claim 10, wherein,
the second bearing bush comprises an axial end which extends into the flow channel, and
the flap body is spring-loaded against the second bearing bush or against the bush or thrust washer adjoining the second bearing bush via the force of the at least one plate spring.

17. The flap device as recited in claim 10, wherein,
the first bearing bush and the second bearing bush are each fastened in a press-fit in the bore, and
the third bearing bush is fastened in a press-fit in the blind hole.

* * * * *